(12) United States Patent
Kim et al.

(10) Patent No.: US 12,298,718 B2
(45) Date of Patent: May 13, 2025

(54) HOLOGRAM DISPLAY DEVICE AND METHOD OF DRIVING THE SAME

(71) Applicants: Samsung Display Co., LTD., Yongin-si (KR); Seoul National University R&DB Foundation, Seoul (KR)

(72) Inventors: Sang-Ho Kim, Gwangmyeong-si (KR); Dukho Lee, Seoul (KR); Byungchoon Yang, Seoul (KR); Byoungho Lee, Seoul (KR); Jaebum Cho, Seoul (KR)

(73) Assignees: SAMSUNG DISPLAY CO., LTD., Yongin-si (KR); SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 871 days.

(21) Appl. No.: 17/242,723

(22) Filed: Apr. 28, 2021

(65) Prior Publication Data
US 2021/0397130 A1   Dec. 23, 2021

(30) Foreign Application Priority Data
Jun. 17, 2020   (KR) .................. 10-2020-0073707

(51) Int. Cl.
*G03H 1/22* (2006.01)
*G03H 1/08* (2006.01)
*G03H 1/16* (2006.01)

(52) U.S. Cl.
CPC ............. *G03H 1/2294* (2013.01); *G03H 1/08* (2013.01); *G03H 1/16* (2013.01)

(58) Field of Classification Search
CPC .......... G03H 1/2294; G03H 1/08; G03H 1/16; G03H 1/0808; G03H 1/0841; G03H 1/02;
(Continued)

(56) References Cited

U.S. PATENT DOCUMENTS 6,327,008 B1 * 12/2001 Fujiyoshi ............. G09G 3/3607
345/96
7,782,510 B2   8/2010 Wilson et al.
(Continued)

FOREIGN PATENT DOCUMENTS

GB            2578523 A *  5/2020  ......... G02B 27/0103
KR      10-2011-0042319     4/2011
KR         10-1082366       11/2011

*Primary Examiner* — Jyotsna V Dabbi
(74) *Attorney, Agent, or Firm* — KILE PARK REED & HOUTTEMAN PLLC

(57) ABSTRACT

A hologram display device includes a light generator generating light, a spatial light modulator forming an interference pattern to interfere with the light, and a controller providing interference data to the spatial light modulator to form the interference pattern. The spatial light modulator includes a first area in which pixels are arranged in a first pattern, and a second area in which pixels are arranged in a second pattern. The controller includes a data generator generating first interference data for the first area and second interference data for the second area, a compensator generating first correction data based on the first interference data and second correction data by correcting the second interference data, and an output unit generating the interference data based on the first correction data and the second correction data.

10 Claims, 13 Drawing Sheets

(58) Field of Classification Search
CPC .......... G03H 1/0866; G03H 1/22; G03H 1/32; G03H 1/04; G03H 1/0443; G03H 1/0858; G03H 1/12; G03H 2001/0224; G03H 2001/303; G03H 2001/2263; G03H 2223/15; G03H 2001/2297; G03H 2001/0088; G03H 2225/00; G03H 2225/12; G03H 2225/35; G03H 2225/32; G03H 2225/34; G03H 2225/33; G03H 2225/52; G03H 2226/02; G03H 2222/34; G03H 2222/22; G03H 2222/18; G03H 2225/61; G03H 2240/61; G02B 2027/014; G02B 2027/0112
USPC .......................................................... 359/9
See application file for complete search history.

(56) References Cited

U.S. PATENT DOCUMENTS

| | | |
|---|---|---|
| 8,077,365 B2 | 12/2011 | Cable |
| 2011/0085116 A1 | 4/2011 | Kim |
| 2016/0209809 A1* | 7/2016 | Kim .................. G02F 1/134336 |
| 2016/0320752 A1* | 11/2016 | Seo ....................... G03H 1/0841 |
| 2019/0011881 A1 | 1/2019 | Tan et al. |
| 2019/0361396 A1 | 11/2019 | Christmas |

* cited by examiner

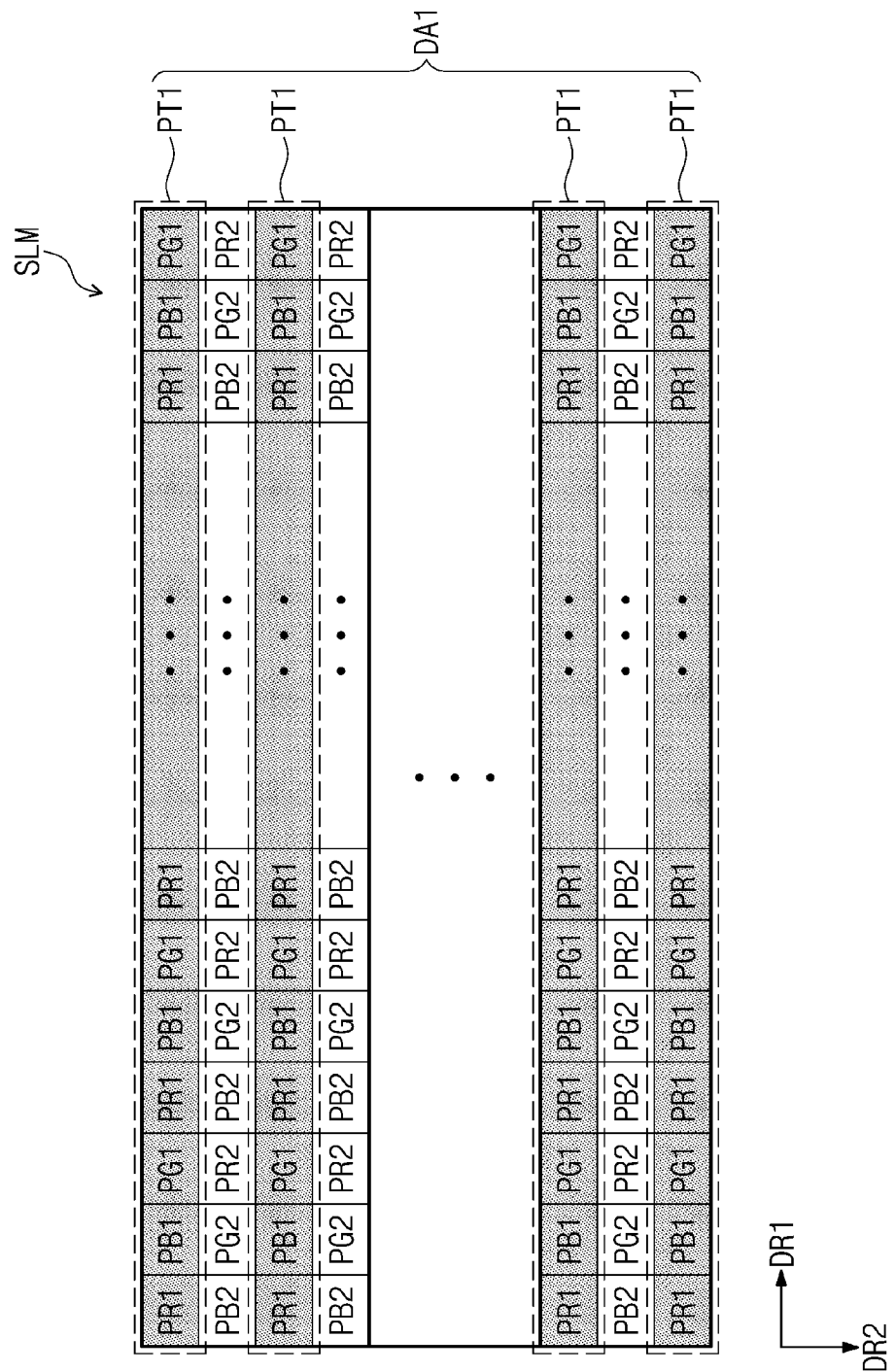

HOLOGRAM DISPLAY DEVICE AND METHOD OF DRIVING THE SAME

CROSS-REFERENCE TO RELATED APPLICATION(S)

This U.S. non-provisional patent application claims priority to and benefits of Korean Patent Application No. 10-2020-0073707 under 35 U.S.C. § 119, filed on Jun. 17, 2020, the contents of which are hereby incorporated by reference in its entirety.

BACKGROUND

1. Field of Disclosure

The disclosure relates to a hologram display device and a method of driving the same. More particularly, the present disclosure relates to a hologram display device preventing noise of a holographic image (or a three-dimensional image) and a method of driving the hologram display device.

2. Description of the Related Art

Three-dimensional (3D) image technology using hologram technology has been and are being developed as one of the next generation 3D image technologies. The 3D image technology is able to substantially avoid visual fatigue that is generally incurred to users of a display using stereoscopic technology that relies on binocular disparity to view the 3D image. A user can see an image formed in three-dimension in the 3D image technology, while the stereoscopic technology or the like uses illusion of eyes to obtain a 3D effect. In a display utilizing the 3D image technology, a user can experience 3D effect that has no or little difference from when the user sees the real thing of a 3D image. Thus, the hologram technology has advantages such that it can substantially reduce or mitigate visual fatigue of a viewer even during or after a long time watch.

SUMMARY

The disclosure provides a hologram display device capable of preventing noise of a holographic image from occurring.

The disclosure provides a method of driving the hologram display device.

In an embodiment, a hologram display device may include a light generator that generate light, a spatial light modulator that forms an interference pattern to interfere with the light, and a controller that provides interference data to the spatial light modulator to form the interference pattern. The spatial light modulator may include a first area in which pixels are arranged in a first pattern, and a second area in which pixels are arranged in a second pattern different from the first pattern. The controller may include a data generator, a compensator, and an output unit. The data generator may generate first interference data for the first area and second interference data for the second area. The compensator may generate first correction data based on the first interference data, and second correction data by correcting the second interference data using a first difference value between the first pattern and the second pattern. The output unit may generate the interference data based on the first correction data and the second correction data.

The first difference value may include a first horizontal difference value defined by a difference between an average value of position data in a first direction of first reference pixels selected from the pixels arranged in the first area and displaying a same color and an average value of position data in the first direction of second reference pixels selected from the pixels arranged in the second area and displaying a same color of the first reference pixels, and a first vertical difference value defined by a difference between an average value of position data in a second direction intersecting the first direction of the first reference pixels and an average value of position data in the second direction of the second reference pixels.

The first area may include the first pattern in all odd-numbered rows of the spatial light modulator, the second area may include the second pattern in all even-numbered rows of the spatial light modulator, and an arrangement of the first reference pixels in the first pattern is different from an arrangement of the second reference pixels in the second pattern.

The compensator may include a first converter that performs a Fourier transform on the first interference data to generate first frequency data and performs the Fourier transform on the second interference data to generate second frequency data, and the compensator outputs the first frequency data as the first correction data.

The compensator may include a multiplier that multiplies the second frequency data by a first compensation value to generate the second correction data. The first compensation value may be determined in accordance with the first difference value.

The output unit may include a synthesizer that generates frequency data based on the first correction data and the second correction data, and a second converter that performs an inverse Fourier transform on the frequency data to output the interference data.

The spatial light modulator may include a third area in which pixels are arranged in a third pattern different from the first and second patterns. The data generator may generate third interference data for the third area. The compensator may generate third correction data by correcting the third interference data using a second difference value between the first pattern and the third pattern. The output unit may generate the interference data based on the first correction data, the second correction data, and the third correction data.

The first difference value may include a first horizontal difference value defined by a difference between an average value of position data in a first direction of first reference pixels selected from the pixels arranged in the first area and displaying a same color and an average value of position data in the first direction of second reference pixels selected from the pixels arranged in the second area and displaying a same color of the first reference pixels, and a first vertical difference value defined by a difference between an average value of position data in a second direction intersecting the first direction of the first reference pixels and an average value of position data in the second direction of the second reference pixels. The second difference value may include a second horizontal difference value defined by a difference between the average value of the position data in the first direction of the first reference pixels and an average value of position data in the first direction of third reference pixels selected from the pixels arranged in the third area and displaying a same color of the first reference pixels, and a second vertical difference value defined by a difference between the average value of the position data in the second direction of the first reference pixels and an average value of position data in the second direction of the third reference pixels.

The compensator may include a first converter that performs a Fourier transform on the first interference data to generate first frequency data, performs the Fourier transform on the second interference data to generate second frequency data, and performs the Fourier transform on the third interference data to generate third frequency data, and the compensator may output the first frequency data as the first correction data.

The compensator may include a first multiplier that multiplies the second frequency data by a first compensation value to generate the second correction data, the first compensation value being determined in accordance with the first difference value, and may include a second multiplier that multiplies the third frequency data by a second compensation value to generate the third correction data, the second compensation value being determined in accordance with the second difference value.

The output unit may include a synthesizer outputting frequency data based on the first correction data, the second correction data, and the third correction data, and a second converter performing an inverse Fourier transform on the frequency data to output the interference data.

Provided is another embodiment of a method of driving a hologram display device that may include a light generator generating light, a spatial light modulator forming an interference pattern to interfere with the light, and a controller providing interference data to the spatial light modulator to form the interference pattern, the spatial light modulator including a first area in which pixels are arranged in a first pattern, and a second area in which pixels are arranged in a second pattern. The method may include generating first interference data for the first area and second interference data for the second area using the controller, generating first correction data based on the first interference data, correcting the second interference data using a first difference value between the first pattern and the second pattern to generate second correction data, and generating the interference data based on the first correction data and the second correction data.

The generating of the first correction data may include performing a Fourier transform on the first interference data to output the first correction data.

The generating of the second correction data may include performing the Fourier transform on the second interference data to generate second frequency data, and multiplying the second frequency data by a first compensation value to generate the second correction data. The first compensation value may be determined in accordance with the first difference value.

The generating of the interference data may include generating frequency data based on the first correction data and the second correction data, and performing an inverse Fourier transform on the frequency data to generate the interference data.

Provided is another embodiment of a method of driving a hologram display device that may include a light generator generating light, a spatial light modulator forming an interference pattern to interfere with the light, and a controller providing interference data to the spatial light modulator to form the interference pattern, the spatial light modulator including a first area in which pixels are arranged in a first pattern, a second area in which pixels are arranged in a second pattern, and a third area in which pixels are arranged in a third pattern. The method may include generating first interference data for the first area, second interference data for the second area, and third interference data for the third area using the controller, generating first correction data based on the first interference data, correcting the second interference data using a first difference value between the first pattern and the second pattern to generate second correction data, correcting the third interference data using a second difference value between the first pattern and the third pattern to generate third correction data, and generating the interference data based on the first correction data, the second correction data, and the third correction data.

The generating of the first correction data may include performing a Fourier transform on the first interference data to output the first correction data.

The generating of the second correction data may include performing the Fourier transform on the second interference data to generate second frequency data, and multiplying the second frequency data by a first compensation value to generate the second correction data. The first compensation value may be determined in accordance with the first difference value.

The generating of the third correction data may include performing the Fourier transform on the third interference data to generate third frequency data, and multiplying the third frequency data by a second compensation value to generate the third correction data. The second compensation value being determined in accordance with the second difference value.

The generating of the interference data may include generating frequency data based on the first correction data, the second correction data, and the third correction data, and performing an inverse Fourier transform on the frequency data to generate the interference data.

In the embodiments, the interference pattern of the hologram display device may be formed. Thus, the noise of the holographic image may be prevented or mitigated.

BRIEF DESCRIPTION OF THE DRAWINGS

The above and other advantages of the disclosure will become readily apparent by reference to the following detailed description when considered in conjunction with the accompanying drawings wherein:

FIGS. 3A and 3B are schematic plan views explaining a spatial light modulator according to an embodiment of the disclosure;

DETAILED DESCRIPTION OF THE EMBODIMENTS

Figure 1:
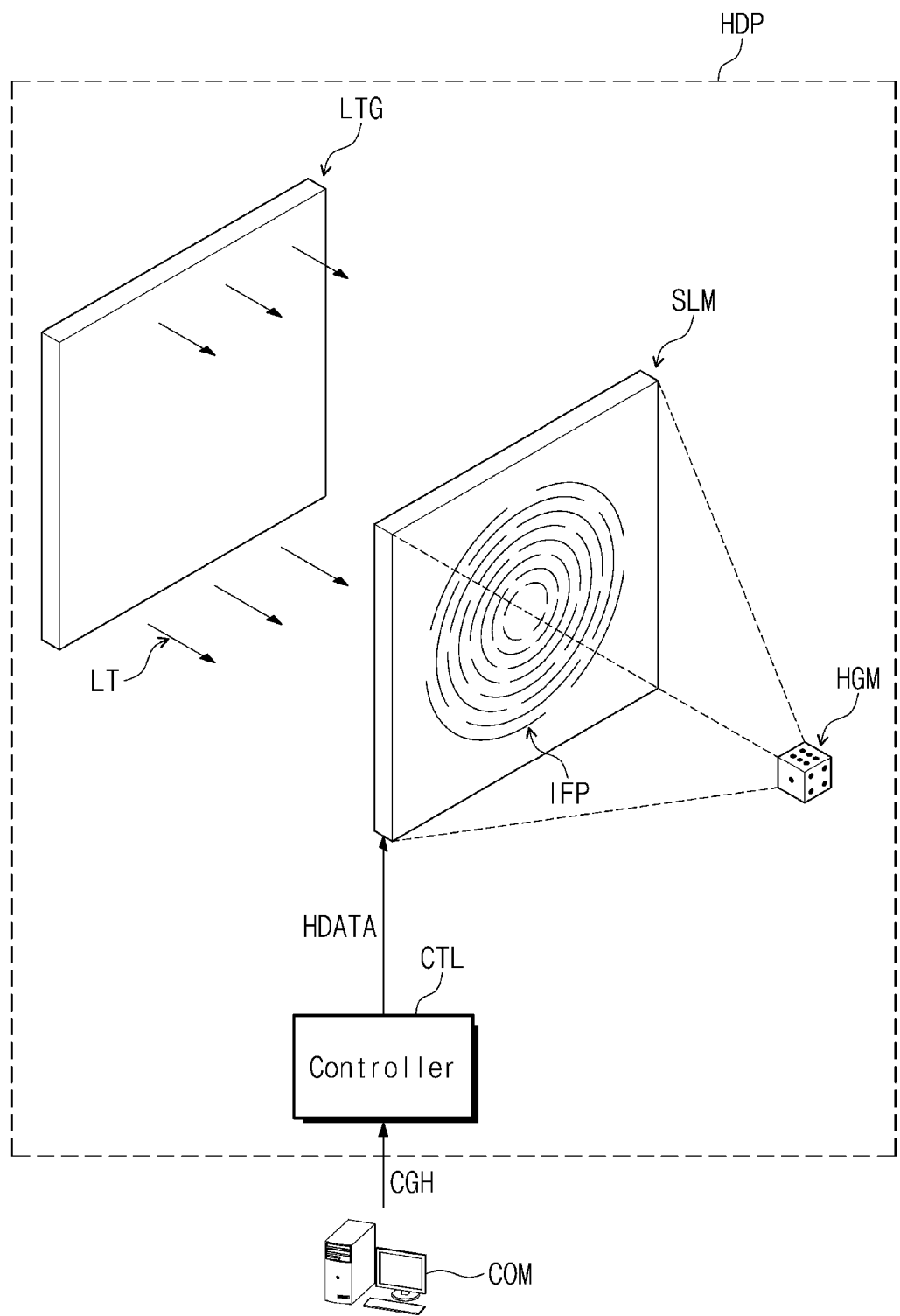
FIG. 1 is a schematic view showing a hologram display device according to an embodiment of the disclosure.

In the disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure. As used herein, the singular forms, "a", "an" and "the" are intended to include the plural forms as well, unless the context clearly indicates otherwise.

Also, when an element is referred to as being "in contact" or "contacted" or the like to another element, the element may be in "electrical contact" or in "physical contact" with another element; or in "indirect contact" or in "direct contact" with another element.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Spatially relative terms, such as "under", "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the disclosure will be explained in detail with reference to the accompanying drawings.

A hologram method employs technology of recording and reproducing an interference signal obtained by superimposing light (or object wave) reflected from an object and coherent light (or reference wave).

A computer generated hologram (hereinafter, referred to as "CGH") is data calculated by an external device to display a desired holographic image. When the external device transmits the CGH to a spatial light modulator (hereinafter, referred to as "SLM"), holographic interference fringe patterns are formed in the SLM. When a light is irradiated to the SLM, the holographic interference fringe patterns displayed through the SLM are restored to a holographic image.

Figure 2:
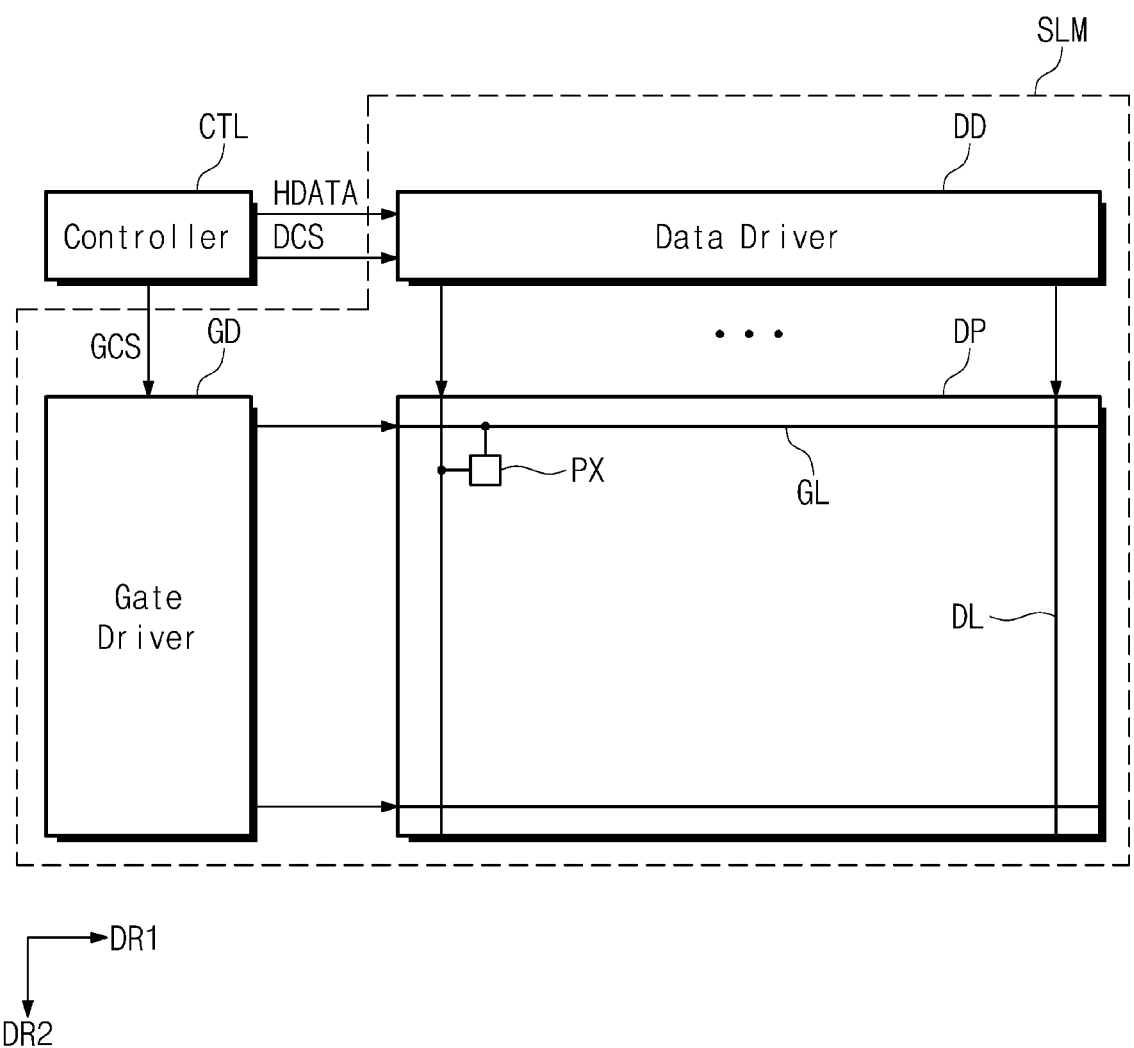
FIG. 2 is a schematic block diagram explaining an operation of a spatial light modulator shown in FIG. 1.

FIG. 1 is a schematic view showing a hologram display device HDP according to an embodiment of the disclosure. FIG. 2 is a schematic block diagram explaining an operation of a spatial light modulator SLM shown in FIG. 1.

Referring to FIG. 1, the hologram display device HDP includes a light generator LTG, a spatial light modulator SLM, and a controller CTL.

The light generator LTG may include at least one light source that generates a light LT. The light generator LTG may emit a coherent surface light. The light source may be a laser or a light emitting diode, which emits the coherent light. The light generator LTG may include red, green, and blue lasers or red, green, and blue light emitting diodes as its light source. As another example, the light generator LTG may include a white light source that emits a white light. The light generator LTG may further include additional elements to shape the light LT, which is emitted from the light source, in a form of a surface light substantially parallel to one side surface of the spatial light modulator SLM.

The spatial light modulator SLM receives the light LT from the light generator LTG and spatially modulates the light LT.

Referring to FIGS. 1 and 2, the spatial light modulator SLM may form an interference pattern IFP corresponding to a holographic image HGM. The light LT emitted from the light generator LTG may be irradiated onto the one side surface of the spatial light modulator SLM. The spatial light modulator SLM may be implemented, for example, in a transmissive liquid crystal display panel that includes two substrates and a liquid crystal layer disposed between the two substrates. In case that the spatial light modulator SLM is the transmissive liquid crystal display panel, the light LT irradiated onto one side of the spatial light modulator SLM may transmit through the interference pattern IFP displayed in the spatial light modulator SLM, and the holographic image HGM may be displayed in the other side of the spatial light modulator SLM.

The spatial light modulator SLM may include a data driver DD, a gate driver GD, and a display panel DP in which the interference pattern IFP is formed. The display panel DP may include pixels PX and signal lines GL and DL electrically connected to the pixels PX. The pixels PX may be arranged in first and second directions DR1 and DR2. The pixels PX may be disposed to be spaced apart from each other so that the pixels PX may not interfere with each other.

The pixels PX may be independently driven by the signal lines GL and DL. The signal lines GL and DL may include gate lines GL and data lines DL. The gate lines GL may be arranged in the first direction DR1, and the data lines DL may be arranged in the second direction DR2 intersecting with the first direction DR1. Each pixel PX may include a transistor, two transparent electrodes, and a liquid crystal layer interposed between the two transparent electrodes. The transistor may be connected to a corresponding gate line GL and a corresponding data line DL to control ON/OFF of each pixel. When each pixel PX is turned on, an electric field is formed between the two transparent electrodes, and a transmittance of the liquid crystal layer varies depending on an intensity of the electric field, thereby controlling a transmittance of the light LT provided from the light generator LTG.

The gate driver GD is electrically connected to the gate lines GL to drive the gate lines GL, and the data driver DD is electrically connected to the data lines DL to drive the data lines DL.

The controller CTL applies a signal to the spatial light modulator SLM to drive the spatial light modulator SLM. The controller CTL receives a computer generated hologram CGH and timing signals from an external device COM, e.g., a computer. The timing signals may include a vertical synchronization signal, a horizontal synchronization signal, a data enable signal, a clock signal, and the like. The controller CTL generates a gate control signal GCS to control the gate driver GD and a data control signal DCS to control the data driver DD, in response to the timing signals. The controller CTL applies the gate control signal GCS to the gate driver GD and applies the data control signal DCS to the data driver DD. The controller CTL also applies interference data HDATA generated based on the computer generated hologram CGH to the data driver DD.

The data driver DD may convert the interference data HDATA into analog gamma compensation voltages to supply the analog gamma compensation voltage, as data voltages, to the data lines DL.

The gate driver GD generates a gate pulse based on the gate control signal GCS so that the gate pulse is synchronized with the data voltages supplied to the date lines DL, and sequentially supplies the gate pulse to the gate lines.

The computer generated hologram CGH is data calculated by the external device COM in order that the interference pattern IFP for a desired holographic image is displayed through the spatial light modulator SLM. The computer generated hologram CGH generated by the computer COM is provided to the spatial light modulator SLM. The computer generated hologram CGH may be calculated by various ways, such as a point-based computer generated holography, a layer-based computer generated holography, a mesh-based computer generated holography, or the like. In general, the computer generated hologram CGH is calculated based on an arrangement of the pixels PX that display a same color in the spatial light modulator SLM and are arranged along a long or short axis of the display panel DP. For example, the pixels of the display panel DP may be arranged according to at least one of stripe pixel arrangement, triangle pixel arrangement, PenTile® arrangement, diamond pixel arrangement, and the like, and the computer generated hologram CGH is calculated based on the pixel arrangement applied to the display panel DP.

Figure 3B:
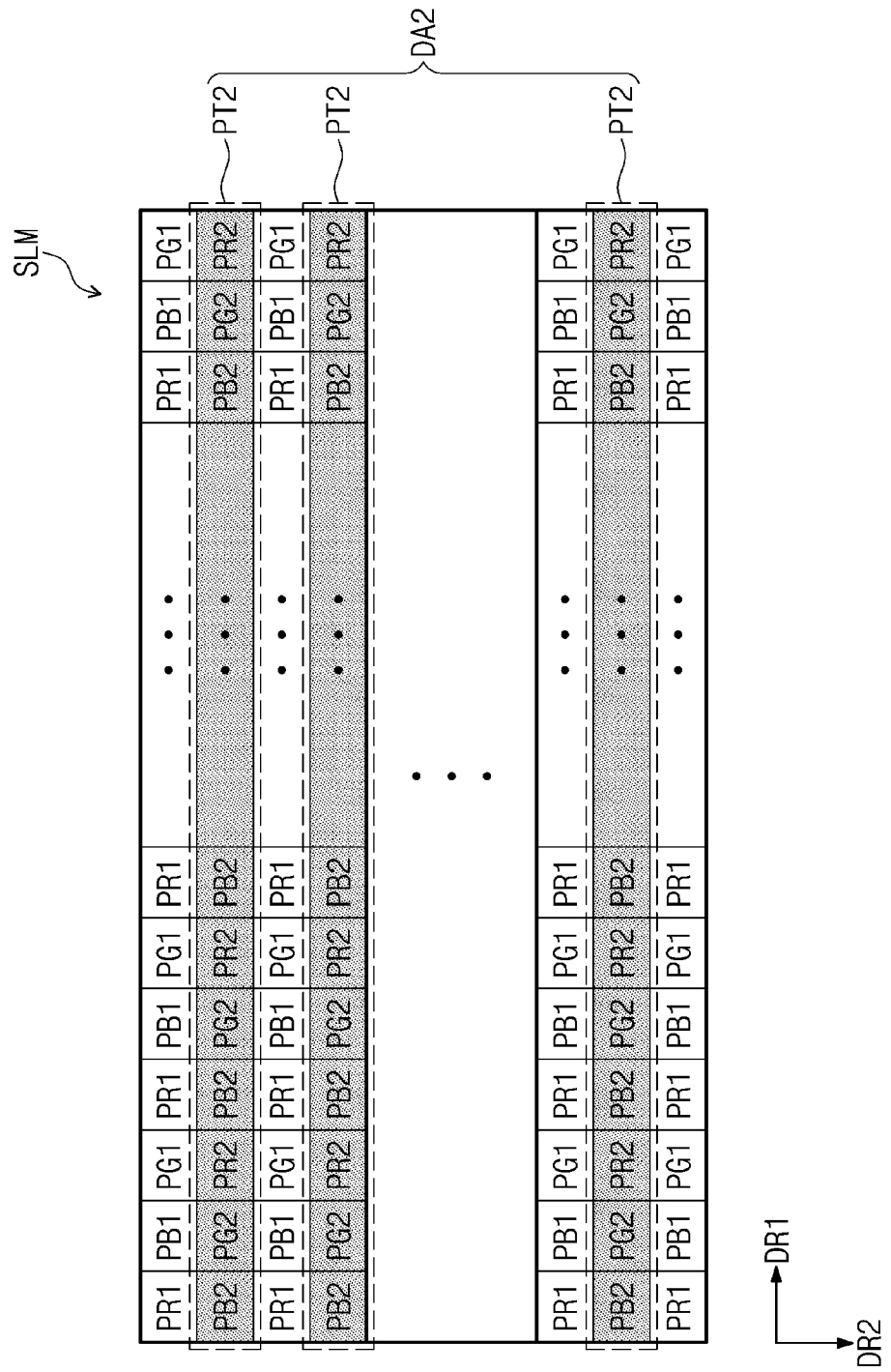

FIGS. 3A and 3B are schematic plan views explaining the spatial light modulator SLM according to an embodiment of the disclosure.

Referring to FIGS. 3A and 3B, the spatial light modulator SLM includes the pixels PX (refer to FIG. 2), and the pixels PX include a first pixel displaying a first color, a second pixel displaying a second color, and a third pixel displaying a third color. A first pattern PT1 and a second pattern PT2 are formed depending on arrangements of the first, second, and third pixels. The spatial light modulator SLM may include a first area DA1 in which the pixels PX are arranged in the first pattern PT1 and a second area DA2 in which the pixels PX are arranged in the second pattern PT2. In an embodiment, the first pattern PT1 may include odd-numbered pixel rows, and the pixels PX are arranged in an order of the first pixel, the second pixel, and the third pixel in each odd-numbered pixel row. The second pattern PT2 may include even-numbered pixel rows, and the pixels PX are arranged in an order of the second pixel, the third pixel, and the first pixel in each even-numbered pixel row.

Figure 4:
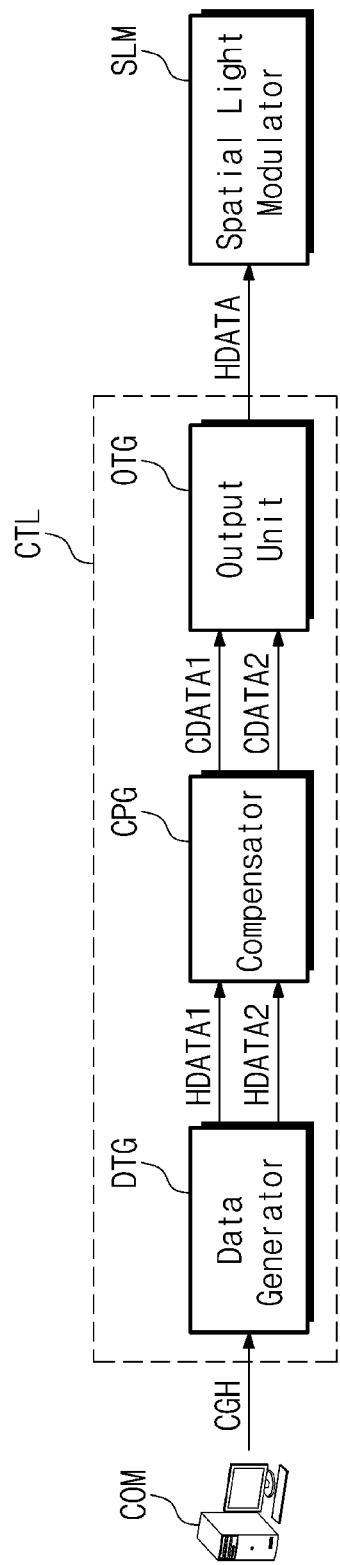
FIG. 4 is a schematic block diagram showing a controller according to an embodiment of the disclosure.

The first pattern PT1 may include all odd-numbered pixel rows of the spatial light modulator SLM, and the second pattern PT2 may include all even-numbered pixel rows of the spatial light modulator SLM. In the drawings, "PR1", "PB1", and "PG1" indicate first, second, and third pixels in the first area DA1, respectively. "PR2", "PB2", and "PG2" indicate first, second, and third pixels in the second area DA2, respectively. Each of pixels in the first and second area DA1 and DA2 displays one of the first to third colors. The first to third colors may include, for example, RGB (red, green, blue), CMY (cyan, magenta, yellow), or the like. In the embodiments, pixels displaying a same one of the first to third colors among the pixels PX arranged in the first area DA1 may be referred to as "first reference pixels", and pixels displaying the same color of the first reference pixels among the pixels PX arranged in the second area DA2 may be referred to as "second reference pixels". An arrangement of the first reference pixels in the first area DA1 is different from an arrangement of the second reference pixels in the second area DA2. In detail, the positions of the first reference pixels in the first direction DR1 in the first area DA1 and the positions of the second reference pixels in the second area DA2 in the first direction DR1 are different. Accordingly, the first and second reference pixels included in the spatial light modulator SLM may not arranged on a line along the second direction DR2. FIG. 4 is a schematic block diagram showing the controller CTL according to an embodiment of the disclosure.

Referring to FIG. 4, the controller CTL of the hologram display device HDP (refer to FIG. 1) may include a data generator DTG, a compensator CPG, and an output unit OTG.

The data generator DTG receives the computer generated hologram CGH from the external computer COM. The data generator DTG divides a whole area of the spatial light modulator SLM into areas in which the pixels PX (refer to FIG. 2) are repeatedly arranged in a regular pattern and generates the interference data corresponding to each area based on the received computer generated hologram CGH.

In an embodiment of the disclosure, the data generator DTG may divide a whole area of the spatial light modulator SLM into the first area DA1 (refer to FIG. 3A) and the second area DA2 (refer to FIG. 3B). The data generator DTG generates first interference data HDATA1 for the first area DA1 and second interference data HDATA2 for the second area DA2 based on the received computer generated hologram CGH.

The compensator CPG receives the first and second interference data HDATA1 and HDATA2 from the data generator DTG. The compensator CPG may set one among the areas, which are divided by the data generator DTG, of the spatial light modulator SLM as a reference area for calculating a difference value. The compensator CPG may correct the first and second interference data HDATA1 and HDATA2 based on a difference value between the patterns of the pixels PX arranged in the reference area and the pixels PX arranged in another area. For example, the difference value may be obtained by comparing the position data of the pixels PX arranged in the reference area with the position data of the pixels PX arranged in another area. The compensator CPG may output correction data by correcting the first and second interference data HDATA1 and HDATA2 based on the difference value.

In an embodiment of the disclosure, the compensator CPG may receive the first and second interference data HDATA1 and HDATA2 from the data generator DTG. The compensator CPG may set the first area DA1 as the reference area. The compensator CPG may obtain a first difference value MD1 (refer FIG. 6) by comparing position data of the second reference pixels arranged in the second area DA2 and the first reference pixels arranged in the first area DA1. The compensator CPG may not separately compensate the first interference data HDATA1 for the first area DA1 that is the reference area. Accordingly, the compensator CPG may generate first correction data CDATA1 based on the first interference data HDATA1. The compensator CPG may correct the second interference data HDATA2 for the second area DA2 based on the first difference value MD1 and output second correction data CDATA2.

The output unit OTG receives the first and second correction data CDATA1 and CDATA2 from the compensator CPG. The output unit OTG outputs the interference data HDATA based on the received first and second correction data CDATA1 and CDATA2.

In an embodiment of the disclosure, the output unit OTG receives the first correction data CDATA1 and the second correction data CDATA2 from the data generator DTG and outputs the interference data HDATA based on the first and second correction data CDATA1 and CDATA2.

The spatial light modulator SLM receives the interference data HDATA from the output unit OTG and forms the interference pattern IFP (refer to FIG. 1).

Figure 5A:
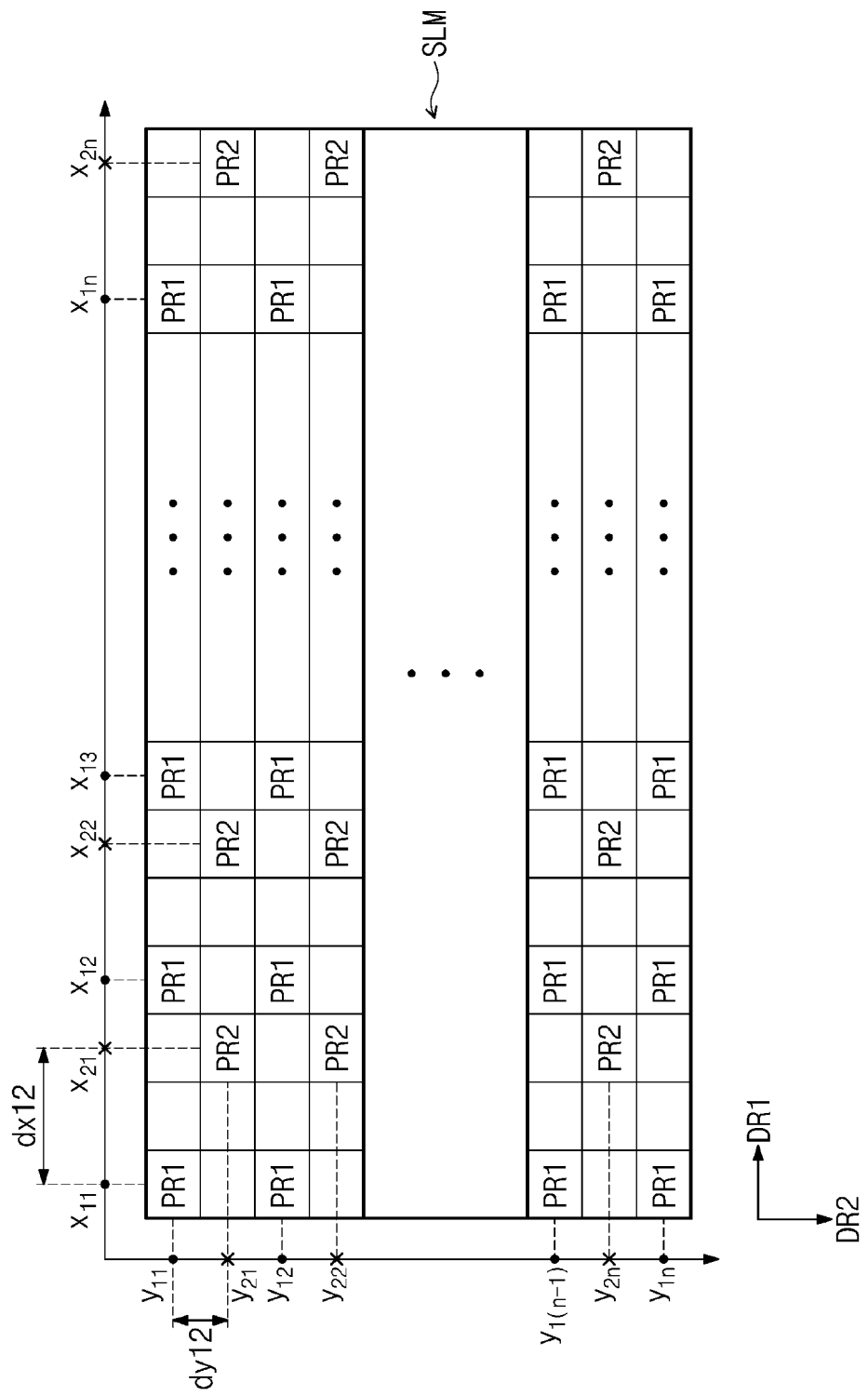
FIG. 5A to FIG. 5C are schematic plan views explaining a spatial light modulator according to an embodiment of the disclosure.
Figure 5B:
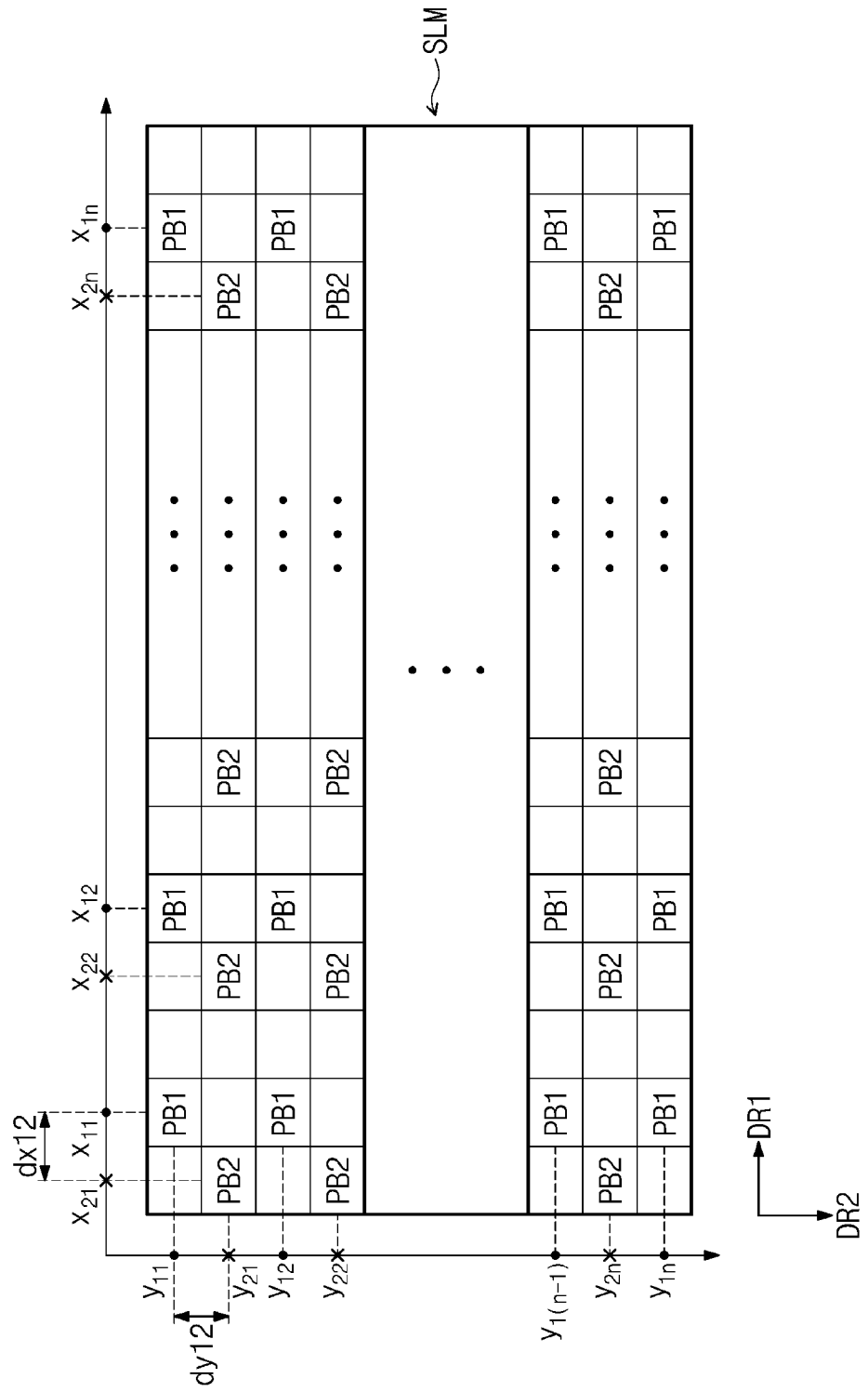
Figure 5C:
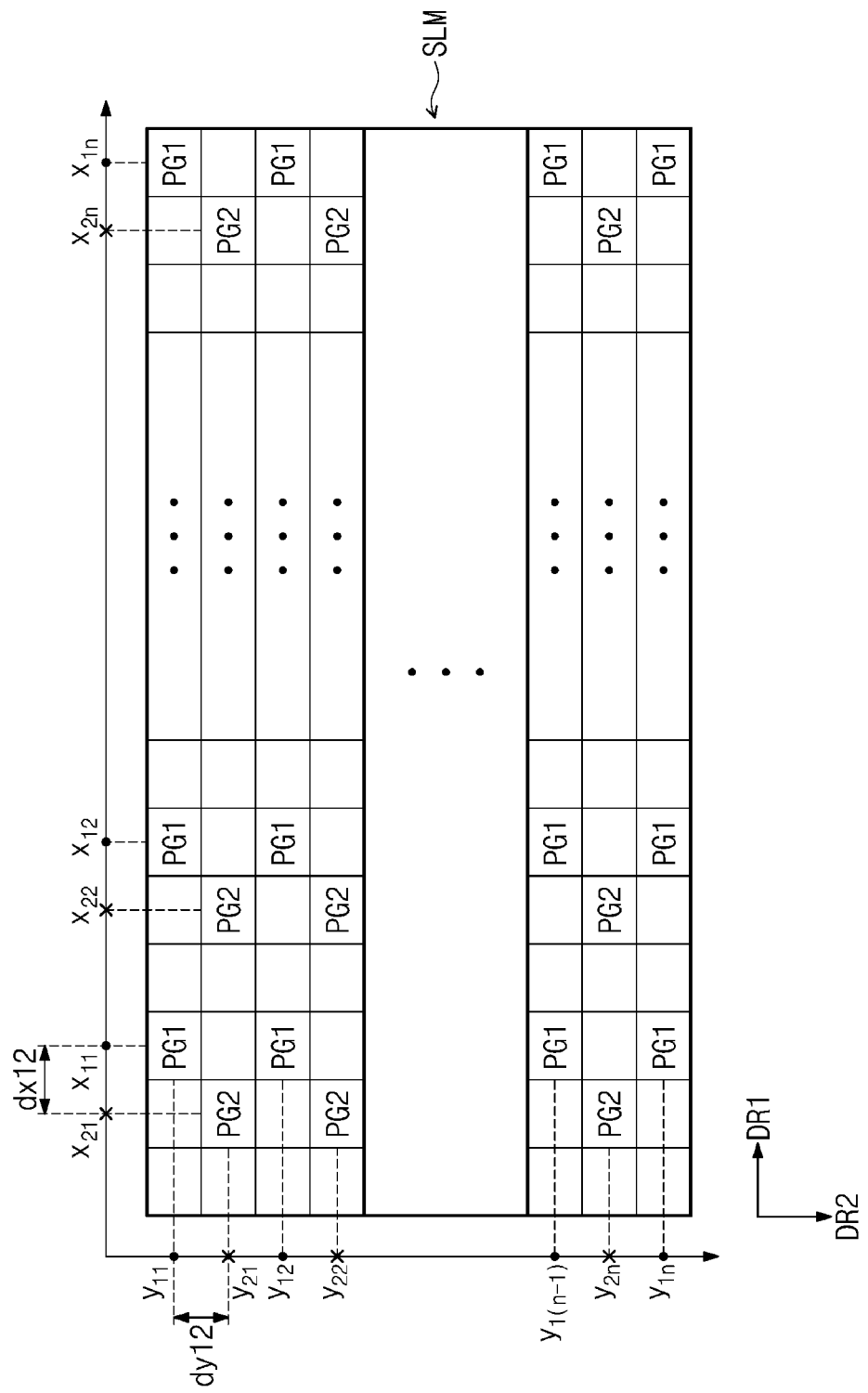

FIGS. 5A to 5C are schematic plan views explaining the spatial light modulator SLM according to an embodiment of the disclosure.

The first difference value MD1 (refer to FIG. 6) may be obtained by comparing position data of the first reference pixels arranged in the first area DA1 (refer to FIG. 3A) and the second reference pixels arranged in the second area DA2 (refer to FIG. 3B). In an embodiment of the disclosure, the first difference value MD1 may include a first horizontal difference value dx12 and a first vertical difference value dy12.

In an embodiment of the disclosure, a difference between an average value of the position data x11 to x1$n$ of the first reference pixels in the first direction DR1 and an average value of the position data x21 to x2$n$ of the second reference pixels in the first direction DR1 may be referred to as a "first horizontal difference value dx12".

In addition, a difference between an average value of the position data y11 to y1$n$ of the first reference pixels in the second direction DR2 intersecting the first direction DR1 and an average value of the position data y21 to y2$n$ of the second reference pixels in the second direction DR2 may be referred to as a "first vertical difference value dy12".

Referring to FIG. 4 and FIG. 5A, first red pixels PR1 arranged in the first area DA1 of the spatial light modulator SLM are referred to as the first reference pixels, second red pixels PR2 arranged in the second area DA2 may be referred to as the second reference pixels.

The computer generated hologram CGH is calculated with respect to the first and second reference pixels PR1 and PR2 displaying the first color. The controller CTL generates the interference data HDATA with respect to the first and second reference pixels PR1 and PR2 and outputs the interference data HDATA.

Referring to FIG. 4 and FIG. 5B, first blue pixels PB1 arranged in the first area DA1 of the spatial light modulator SLM may be referred to as the first reference pixels, and second blue pixels PB2 arranged in the second area DA2 may be referred to as the second reference pixels.

The computer generated hologram CGH is calculated with respect to the first and second reference pixels PB1 and PB2 displaying the second color. The controller CTL generates the interference data HDATA with respect to the first and second reference pixels PB1 and PB2 and outputs the interference data HDATA.

Referring to FIG. 4 and FIG. 5C, first green pixels PG1 arranged in the first area DA1 of the spatial light modulator SLM may be referred to as the first reference pixels, and second green pixels PG2 arranged in the second area DA2 may be referred to as the second reference pixels.

The computer generated hologram CGH is calculated with respect to the first and second reference pixels PG1 and PG2 displaying the third color. The controller CTL generates the interference data HDATA with respect to the first and second reference pixels PG1 and PG2 and outputs the interference data HDATA.

The interference data HDATA with respect to the pixels PR1, PR2, PB1, PB2, PG1, PG2 respectively displaying the first, second, and third colors are input to the spatial light modulator SLM, and the interference pattern IFP (refer to FIG. 1) may be formed based on the interference data HDATA.

Figure 6:
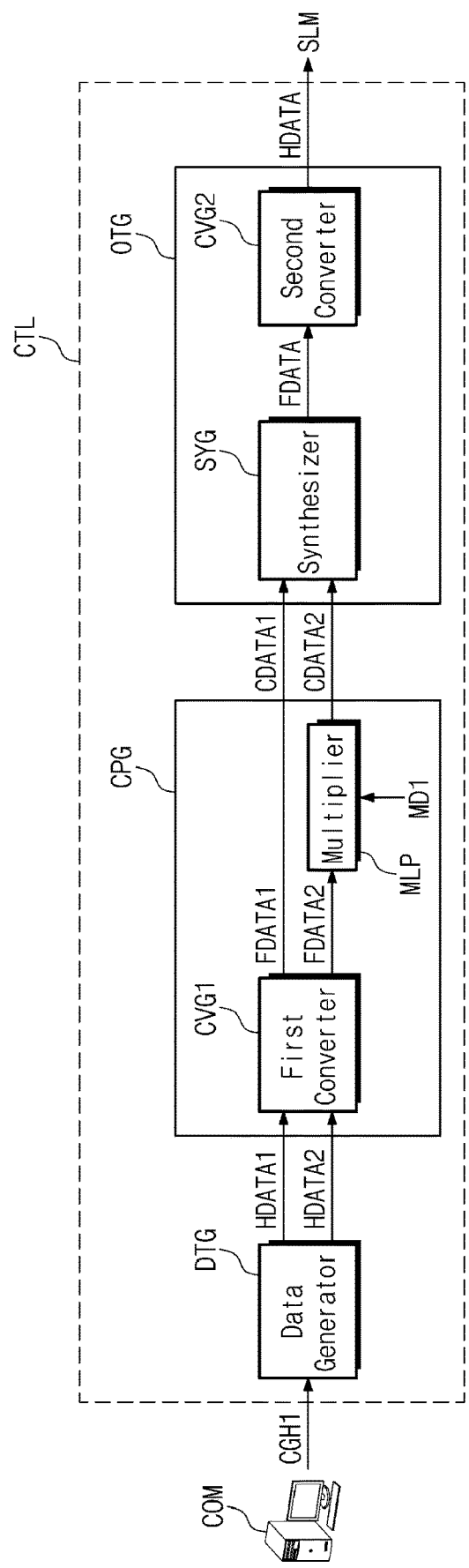
FIG. 6 is a schematic block diagram showing a controller according to an embodiment of the disclosure.

FIG. 6 is a schematic block diagram showing the controller CTL according to an embodiment of the disclosure.

Referring to FIG. 6, the compensator CPG may include a first converter CVG1 and a multiplier MLP. The output unit OTG may include a synthesizer SYG and a second converter CVG2.

As the first converter CVG1 performs a Fourier transform on the first interference data HDATA1 and the second interference data HDATA2, the first interference data HDATA1 and the second interference data HDATA2, each of which has a spatial region domain, may be converted into first frequency data FDATA1 and second frequency data FDATA2, each of which has a frequency region domain, respectively.

In an embodiment, the first converter CVG1 receives the first interference data HDATA1 and the second interference data HDATA2 from the data generator DTG. The first converter CVG1 performs the Fourier transform on the first interference data HDATA1 to generate the first frequency data FDATA1 and performs the Fourier transform on the second interference data HDATA2 to generate the second frequency data FDATA2. The compensator CPG outputs the first frequency data FDATA1 as the first correction data CDATA1.

The multiplier MLP receives the second frequency data FDATA2 from the first converter CVG1. The multiplier MLP multiplies the second frequency data FDATA2 by a first compensation value CMP1, which is determined according to the first difference value MD1, to generate the second correction data CDATA2. The compensator CPG outputs the second correction data CDATA2.

The first compensation value CMP1 satisfies the following Equation 1.

$$CMP1 = e^{-j*2*\pi*(f_x*d_x + f_y*d_y)} \quad \text{Equation 1}$$

In Equation 1, $f_x$ denotes a spatial frequency of an x-axis in the frequency region domain, $f_y$ denotes a spatial frequency of a y-axis, $\pi$ denotes pi, j denotes an unit imaginary number, $d_x$ denotes the first horizontal difference value, and $d_y$ denotes the first vertical difference value.

The synthesizer SYG receives the first correction data CDATA1 and the second correction data CDATA2 from the compensator CPG. The synthesizer SYG synthesizes the first correction data CDATA1 and the second correction data CDATA2 to generate frequency data FDATA and outputs the frequency data FDATA.

The second converter CVG2 receives the frequency data FDATA from the synthesizer SYG and performs an inverse Fourier transform on the frequency data FDATA to generate the interference data HDATA. The output unit OTG outputs the interference data HDATA. As the second converter CVG2 performs the inverse Fourier transform on the frequency data FDATA, the frequency data FDATA having the frequency region domain may be converted into the interference data HDATA having the spatial region domain.

In case that the compensator CPG multiplies the second frequency data FDATA2 by a phase term corresponding to the first compensation value CMP1 in the frequency region domain to generate the second correction data CDATA2 and the output unit OTG performs the inverse Fourier transform on the generated frequency data FDATA based on the second correction data CDATA2, the interference data HDATA for which $d_x$ (the first horizontal difference value) and $d_y$ (the first vertical difference value) are considered are generated. Although the pixels PX (refer to FIG. 2) displaying a same color in the spatial light modulator SLM are not arranged along both the first direction DR1 (refer to FIG. 5A) and the second direction DR2 (refer to FIG. 5A) of the display panel DP (refer to FIG. 2), the interference data HDATA, which are obtained considering the structure that the pixels PX are not arranged along the first and second directions DR1 and DR2, are input to the spatial light modulator SLM, and the interference pattern IFP is generated. Accordingly, although the pixels PX of a same color are not arranged along the first and second directions DR1 and DR2 of the display panel DP, noises do not occur in the restored holographic image.

Figure 7:
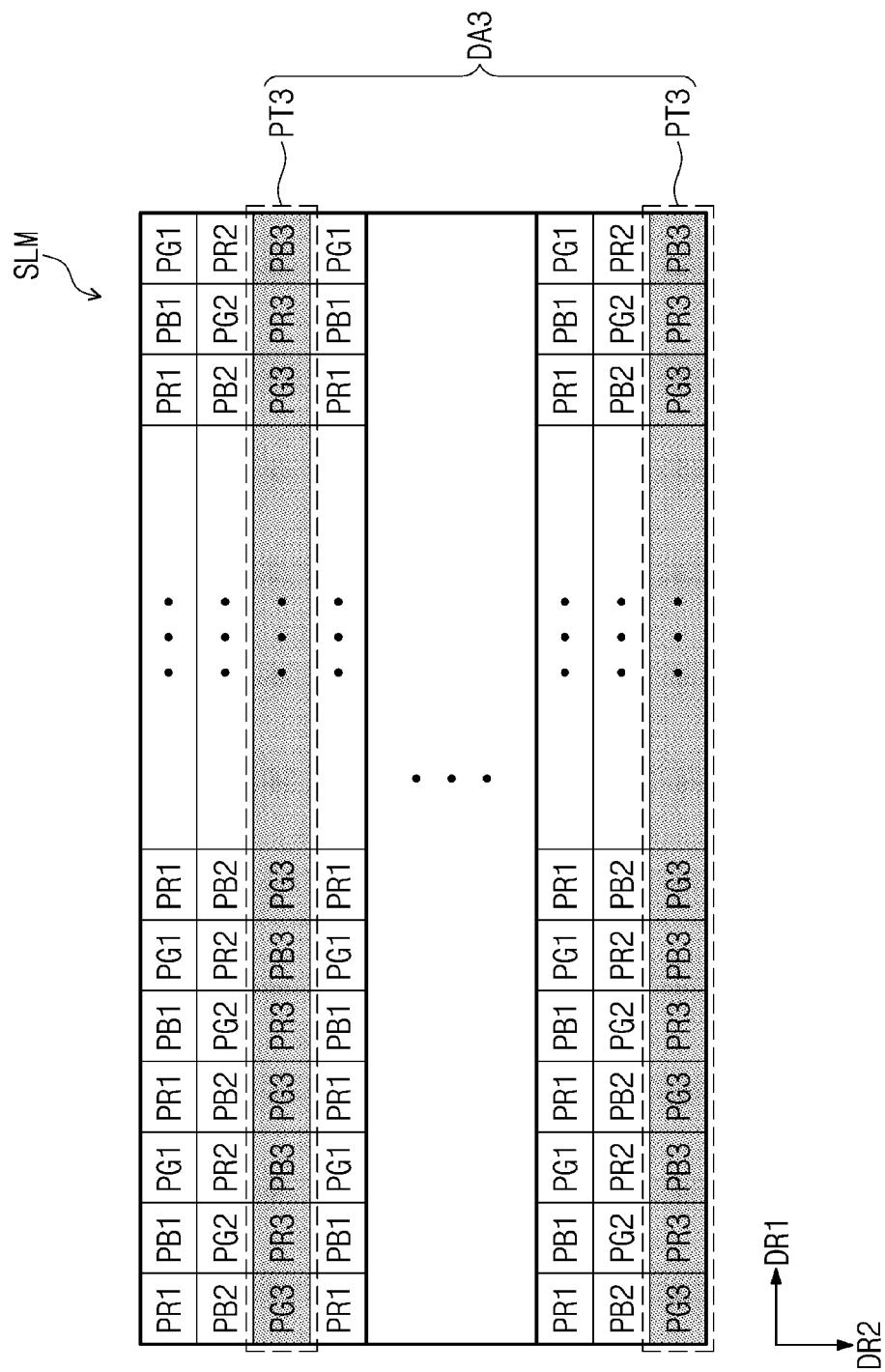
FIG. 7 is a plan view explaining a spatial light modulator according to an embodiment of the disclosure.

FIG. 7 is a schematic plan view explaining the spatial light modulator SLM according to an embodiment of the disclosure.

Referring to FIG. 7, the spatial light modulator SLM may further include a third area DA3 in addition to the first and second areas DA1 and DA2 shown in FIG. 3A and FIG. 3B. In the third area DA3, pixels are arranged in a third pattern PT3 which is different from the first and second patterns PT1 and PT2. In the spatial light modulator SLM, pixels in the first area DA1 (refer to FIG. 3A) are arranged in the first pattern PT1, pixels in the second area DA2 are arranged in the second pattern PT2, and pixels in the third area DA3 are arranged in the third pattern PT3.

For example, the first pattern includes the pixels arranged in an order of the first pixel, the second pixel, and the third pixel. The second pattern includes the pixels arranged in an order of the second pixel, the third pixel, and the first pixel. The third pattern includes the pixels arranged in an order of the the third pixel, the first pixel, and second pixel. In drawings, "PR1", "PB1", and "PG1" indicate first, second, and third pixels in the first area DA1, respectively. "PR2", "PB2", and "PG2" indicate first, second, and third pixels in the second area DA2, respectively. "PR3", "PB3", and "PG3" indicate first, second, and third pixels in the second area DA3, respectively. Each of pixels in the first to third area DA1 to DA3 displays one of the first to third colors. The first to third colors may include, for example, RGB (red, green, blue), CMY (cyan, magenta, yellow), or the like.

In the embodiments, the pixels displaying a same one of the first to third colors, among the pixels PX arranged in the first area DA1, may be referred to as "first reference pixels", the pixels displaying the same color of the first reference pixels, among the pixels PX arranged in the second area DA2, may be referred to as "second reference pixels", and the pixels displaying the same color of the first reference pixels, among the pixels PX arranged in the third area DA3, may be referred to as "third reference pixels". An arrangement of the first reference pixels in the first area DA1 and an arrangement of the second reference pixels in the second area DA2 are different from an arrangement of the third reference pixels in the third area DA3. In detail, the first reference pixels, the second reference pixels, and the third reference pixels may not arranged in a same line along the first direction DR1 and the second direction DR2.

Figure 8:
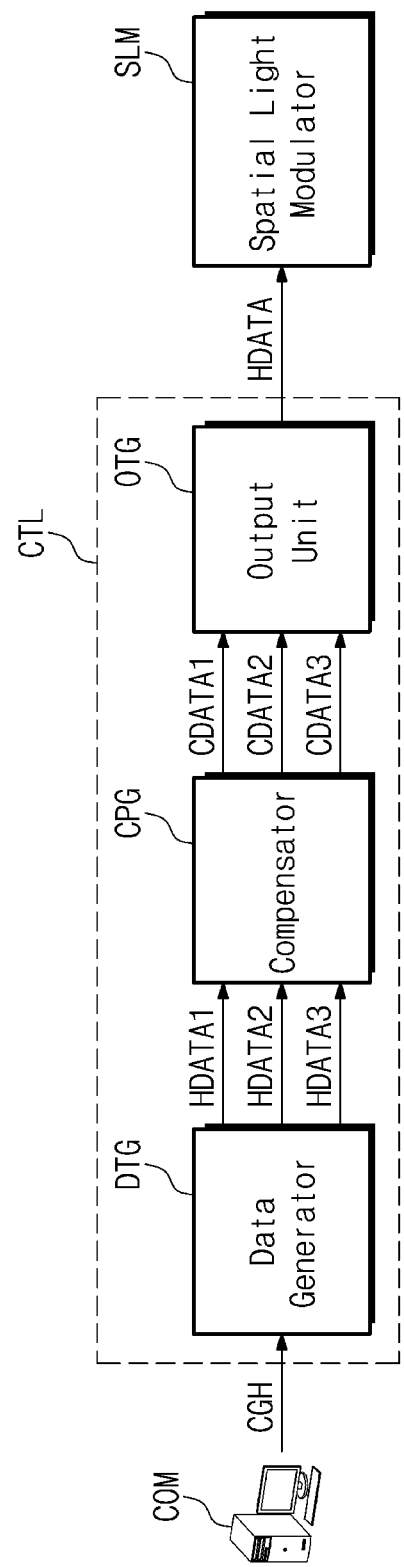
FIG. 8 is a schematic block diagram showing a controller according to an embodiment of the disclosure.

FIG. 8 is a schematic block diagram showing a controller CTL according to an embodiment of the disclosure. Hereinafter, a detailed description of the same configuration as the configuration described with reference to FIG. 4 will be omitted.

Referring to FIG. 7 and FIG. 8, a data generator DTG generates first interference data HDATA1 for the first area DA1, second interference data HDATA2 for the second area DA2, and third interference data HDATA3 for the third area DA3 of the spatial light modulator SLM.

The compensator CPG may receive the first, second and third interference data HDATA1, HDATA2 and HDATA3 from the data generator DTG. In an embodiment of the disclosure, the compensator CPG may set the first area DA1 as the reference area. The compensator CPG may obtain the first difference value MD1 (refer FIG. 10) by comparing position data of the second reference pixels arranged in the second area DA2 and the first reference pixels arranged in the first area DA1. The compensator CPG may obtain a second difference value MD2 (refer FIG. 10) by comparing position data of the third reference pixels arranged in the third area DA3 and the first reference pixels arranged in the first area DA1. The compensator CPG may not separately compensate the first interference data HDATA1 for the first area DA1 that is the reference area. Accordingly, the compensator CPG may generate the first correction data CDATA1 based on the first interference data HDATA1. The compensator CPG may correct the second interference data HDATA2 for the second area DA2 based on the first difference value MD1 and output the second correction data CDATA2. The compensator CPG may correct the third interference data HDATA3 for the third area DA3 based on the second difference value MD2 and output the third correction data CDATA3.

The output unit OTG receives the first, second and third correction data CDATA1, CDATA2 and CDATA3 from the compensator CPG. The output unit OTG outputs the interference data HDATA based on the received first, second and third correction data CDATA1, CDATA2 and CDATA3.

Figure 9:
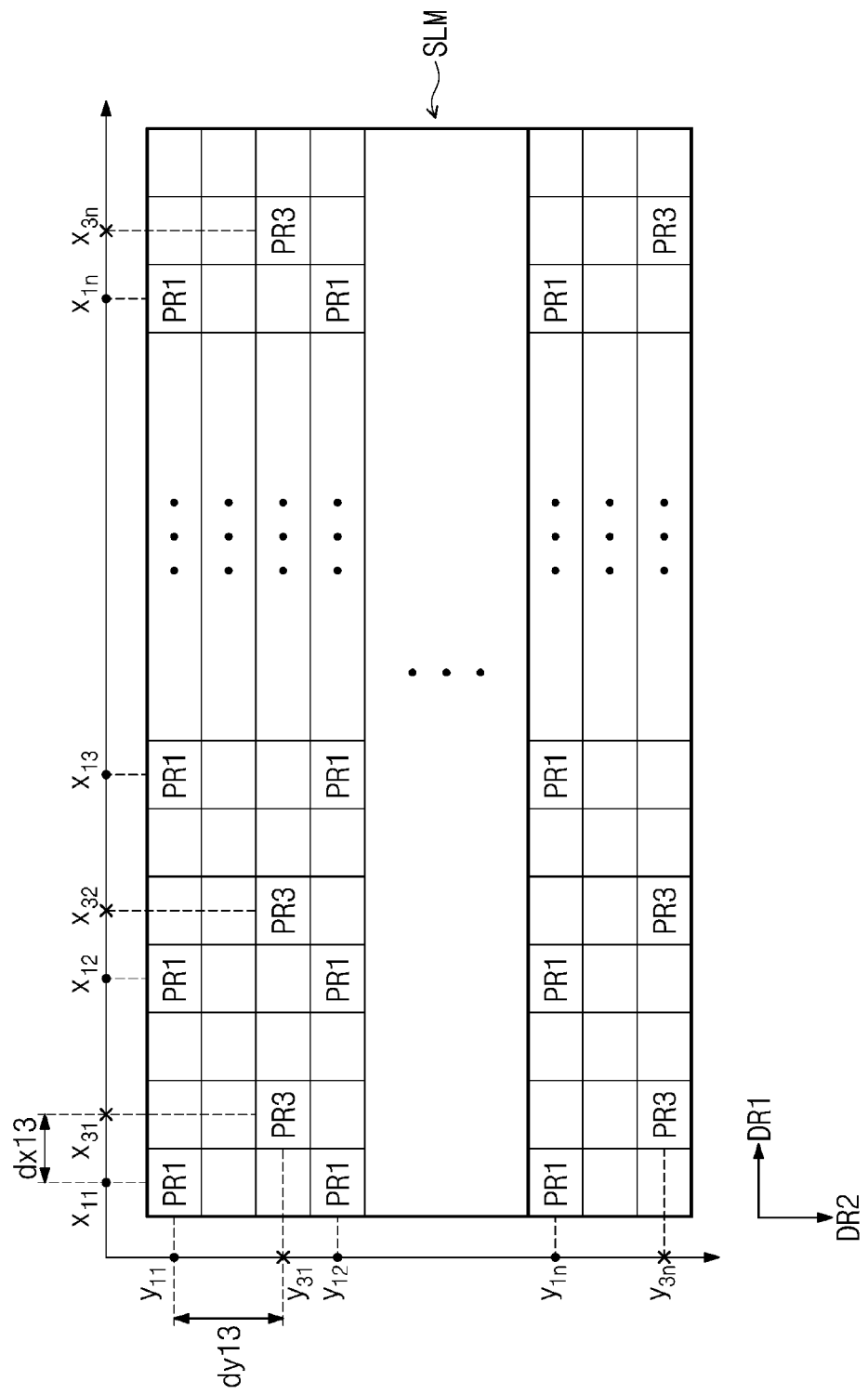
FIG. 9 is a schematic plan view explaining a spatial light modulator according to an embodiment of the disclosure.

FIG. 9 is a schematic plan view explaining the spatial light modulator SLM according to an embodiment of the disclosure.

Referring to FIG. 9, the second difference value MD2 (refer to FIG. 10) may be obtained by comparing position data of the first reference pixels arranged in the first area DA1 (refer to FIG. 7) and the third reference pixels arranged in the third area DA3 (refer to FIG. 7). In an embodiment of the disclosure, the second difference value MD2 includes a second horizontal difference value dx13 and a second vertical difference value dy13.

In an embodiment of the disclosure, a difference between an average value of position data x11 to x1$n$ of the first reference pixels in the first direction DR1 and an average value of position data x31 to x3$n$ of the third reference pixels in the first direction DR1 may be referred to as a "second horizontal difference value dx13".

A difference between an average value of position data y11 to y1n of the first reference pixels in the second direction DR2 and an average value of position data y31 to y3n of the third reference pixels in the second direction DR2 may be referred to as a "second vertical difference value dy13".

Figure 10:
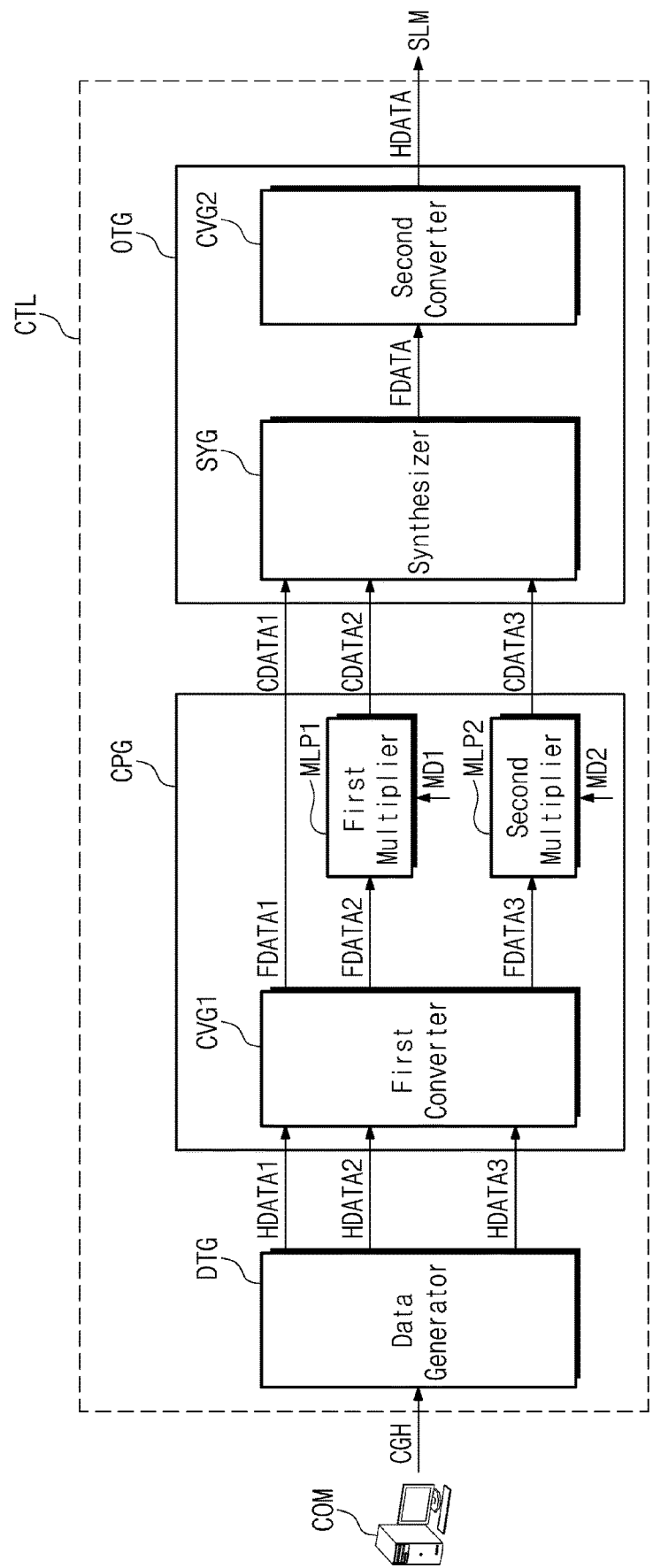
FIG. 10 is a schematic block diagram showing a controller according to an embodiment of the disclosure.

FIG. 10 is a schematic block diagram showing the controller CTL according to an embodiment of the disclosure. Hereinafter, a detailed description of the same configuration as the configuration described with reference to FIG. 6 will be omitted.

Referring to FIG. 10, the compensator CPG may include a first converter CVG1, a first multiplier MLP1, and a second multiplier MLP2. The output unit OTG may include a synthesizer SYG and a second converter CVG2.

The first converter CVG1 performs the Fourier transform on the first interference data HDATA1, the second interference data HDATA2, and the third interference data HDATA3. The first interference data HDATA1, the second interference data HDATA2, and the third interference data HDATA3, each which has a spatial region domain, may be converted into first frequency data FDATA1, second frequency data FDATA2 and third frequency data FDATA3, each of which has a frequency region domain, respectively.

The first converter CVG1 receives the first interference data HDATA1, the second interference data HDATA2, and the third interference data HDATA3 from the data generator DTG. The first converter CVG1 performs a Fourier transform on the first interference data HDATA1 to generate first frequency data FDATA1, performs a Fourier transform on the second interference data HDATA2 to generate second frequency data FDATA2, and performs a Fourier transform on the third interference data HDATA3 to generate third frequency data FDATA3. The compensator CPG outputs the first frequency data FDATA1 as the first correction data CDATA1.

The second multiplier MLP2 receives the third frequency data FDATA3 from the first converter CVG1. The second multiplier MLP2 multiplies the third frequency data FDATA3 by a second compensation value CMP2, which is determined according to the second difference value MD2, to generate the third correction data CDATA3. The compensator CPG outputs the third correction data CDATA3. The second compensation value CMP2 satisfies the above-mentioned Equation 1.

The synthesizer SYG receives the first, second, and third correction data CDATA1, CDATA2, and CDATA3 from the compensator CPG. The synthesizer SYG synthesizes the first, second, and third correction data CDATA1, CDATA2, and CDATA3 to generate the frequency data FDATA and outputs the frequency data FDATA.

In case that the compensator CPG multiplies the third frequency data FDATA3 by a phase term corresponding to the second compensation value CMP2 in the frequency region domain to generate the third correction data CDATA3 and the output unit OTG performs the inverse Fourier transform on the generated frequency data FDATA based on the third correction data CDATA3, the interference data HDATA for which $d_x$ (the second horizontal difference value) and $d_y$ (the second vertical difference value) are considered are generated.

Although the embodiments of the disclosure have been described, it is understood that the disclosure should not be limited to these embodiments but various changes and modifications can be made by one ordinary skilled in the art within the spirit and scope of the disclosure as hereinafter claimed.

Therefore, the disclosed subject matter should not be limited to any single embodiment described herein, and the scope of the invention shall be determined according to the attached claims.

What is claimed is:

1. A hologram display device comprising:
   a light generator that generates light;
   a spatial light modulator that forms an interference pattern to interfere with the light; and
   a controller that provides interference data to the spatial light modulator to form the interference pattern, wherein
   the spatial light modulator comprises:
      a first area in which pixels are arranged in a first pattern that includes pixels in only odd-numbered pixel rows of the spatial light modulator; and
      a second area in which pixels are arranged in a second pattern different from the first pattern, the second pattern including pixels in only even-numbered pixel rows of the spatial light modulator, and
   the controller comprises:
      a data generator that generates first interference data for the first area and second interference data for the second area;
      a compensator that generates:
         first correction data based on the first interference data; and
         second correction data by correcting the second interference data using a first difference value corresponding to a difference in position between pixels of a same color in the first pattern and the second pattern; and
      an output unit that generates the interference data based on the first correction data and the second correction data.

2. The hologram display device of claim 1, wherein the first difference value comprises:
   a first horizontal difference value defined by a difference between:
      an average value of position data in a first direction of first reference pixels selected from the pixels arranged in the first area and displaying a same color, and
      an average value of position data in the first direction of second reference pixels selected from the pixels arranged in the second area and displaying a same color of the first reference pixels; and
   a first vertical difference value defined by a difference between:
      an average value of position data in a second direction intersecting the first direction of the first reference pixels, and
      an average value of position data in the second direction of the second reference pixels.

3. The hologram display device of claim 1, wherein
   the compensator comprises a first converter that performs a Fourier transform on the first interference data to generate first frequency data and performs the Fourier transform on the second interference data to generate second frequency data, and
   the compensator outputs the first frequency data as the first correction data.

4. The hologram display device of claim 3, wherein the compensator comprises a multiplier that multiplies the second frequency data by a first compensation value to generate the second correction data, the first compensation value being determined in accordance with the first difference value.

5. The hologram display device of claim 4, wherein the output unit comprises:
- a synthesizer that generates frequency data based on the first correction data and the second correction data; and
- a second converter that performs an inverse Fourier transform on the frequency data to output the interference data.

6. The hologram display device of claim 1, wherein
the spatial light modulator comprises a third area in which pixels are arranged in a third pattern different from the first and second patterns,
the data generator generates third interference data for the third area,
the compensator generates third correction data by correcting the third interference data using a second difference value between the first pattern and the third pattern, and
the output unit generates the interference data based on the first correction data, the second correction data, and the third correction data.

7. The hologram display device of claim 6, wherein
the first difference value comprises:
- a first horizontal difference value defined by a difference between:
  - an average value of position data in a first direction of first reference pixels selected from the pixels arranged in the first area and displaying a same color, and
  - an average value of position data in the first direction of second reference pixels selected from the pixels arranged in the second area and displaying a same color of the first reference pixels; and
- a first vertical difference value defined by a difference between:
  - an average value of position data in a second direction intersecting the first direction of the first reference pixels, and
  - an average value of position data in the second direction of the second reference pixels, and
the second difference value comprises:
- a second horizontal difference value defined by a difference between:
  - the average value of the position data in the first direction of the first reference pixels, and
  - an average value of position data in the first direction of third reference pixels selected from the pixels arranged in the third area and displaying a same color of the first reference pixels; and
- a second vertical difference value defined by a difference between:
  - the average value of the position data in the second direction of the first reference pixels, and
  - an average value of position data in the second direction of the third reference pixels.

8. The hologram display device of claim 7, wherein
the compensator comprises a first converter that performs a Fourier transform on the first interference data to generate first frequency data, performs the Fourier transform on the second interference data to generate second frequency data, and performs the Fourier transform on the third interference data to generate third frequency data, and
the compensator outputs the first frequency data as the first correction data.

9. The hologram display device of claim 8, wherein the compensator comprises:
- a first multiplier that multiplies the second frequency data by a first compensation value to generate the second correction data, the first compensation value being determined in accordance with the first difference value; and
- a second multiplier that multiplies the third frequency data by a second compensation value to generate the third correction data, the second compensation value being determined in accordance with the second difference value.

10. The hologram display device of claim 9, wherein the output unit comprises:
- a synthesizer outputting frequency data based on the first correction data, the second correction data, and the third correction data; and
- a second converter performing an inverse Fourier transform on the frequency data to output the interference data.

* * * * *